United States Patent
Ducorsky

(10) Patent No.: US 12,450,629 B2
(45) Date of Patent: Oct. 21, 2025

(54) SCOOTER ADVERTISING SYSTEM AND ASSOCIATED METHODS

(71) Applicant: Brad Ducorsky, El Paso, TX (US)

(72) Inventor: Brad Ducorsky, El Paso, TX (US)

( * ) Notice: Subject to any disclaimer, the term of this patent is extended or adjusted under 35 U.S.C. 154(b) by 91 days.

(21) Appl. No.: 18/125,899

(22) Filed: Mar. 24, 2023

(65) Prior Publication Data
US 2023/0316332 A1 Oct. 5, 2023

Related U.S. Application Data

(60) Provisional application No. 63/326,444, filed on Apr. 1, 2022.

(51) Int. Cl.
G06Q 30/02 (2023.01)
G06Q 30/0251 (2023.01)
H04W 4/029 (2018.01)
H04W 4/23 (2018.01)

(52) U.S. Cl.
CPC ........ G06Q 30/0266 (2013.01); H04W 4/029 (2018.02); H04W 4/23 (2018.02)

(58) Field of Classification Search
CPC ........... G06Q 30/0266; G06Q 30/0207; G06Q 30/0277; H04W 4/029; H04W 4/23
See application file for complete search history.

(56) References Cited

U.S. PATENT DOCUMENTS

| | | | |
|---|---|---|---|
| 8,781,968 B1 * | 7/2014 | Bushman | G06Q 30/0241 705/14.5 |
| 9,153,153 B1 * | 10/2015 | Rothstein | B62J 11/00 |
| 11,863,811 B2 * | 1/2024 | Stevens | G09F 27/005 |
| 2005/0150147 A1 * | 7/2005 | Berryman | G09F 21/048 40/590 |
| 2009/0031600 A1 * | 2/2009 | Anderson | G09F 17/00 40/607.01 |
| 2013/0321178 A1 * | 12/2013 | Jameel | H04W 4/40 340/989 |
| 2014/0052534 A1 * | 2/2014 | Gandhi | G06Q 50/01 705/14.58 |
| 2017/0140680 A1 * | 5/2017 | Kucksdorf | G09F 13/005 |
| 2018/0011543 A1 * | 1/2018 | Funami | G06F 3/04812 |
| 2018/0276706 A1 * | 9/2018 | Hoffman | G06V 40/193 |
| 2018/0300746 A1 * | 10/2018 | Terzian | G06T 7/70 |
| 2018/0302484 A1 * | 10/2018 | Kothari | G01C 21/3679 |
| 2019/0311404 A1 * | 10/2019 | Wasserman | G08G 1/096716 |

(Continued)

*Primary Examiner* — Thuy N Nguyen
(74) *Attorney, Agent, or Firm* — Allen, Dyer, Doppelt & Gilchrist, P.A.

(57) ABSTRACT

A scooter advertising system includes a scooter configured to transport a driver, and an advertising module secured to the scooter and configured to receive advertising data. An electronic display screen is coupled to the advertising module and configured to generate an advertising image thereon using the advertising data. The advertising module includes a transceiver configured to wirelessly communicate with a remote server, receive the advertising data, and to transmit data. The advertising module also includes a graphic display controller configured to generate an advertising image from the advertising data and to transmit a signal to the electronic display screen to display the advertising image. A GPS tracking module is configured to determine a location of the scooter when displaying the advertising image.

16 Claims, 4 Drawing Sheets

(56) References Cited

U.S. PATENT DOCUMENTS

| | | | | |
|---|---|---|---|---|
| 2019/0385194 | A1* | 12/2019 | Binkley | G06Q 30/0267 |
| 2020/0086939 | A1* | 3/2020 | Iseman | B62K 3/002 |
| 2020/0104876 | A1* | 4/2020 | Chintakindi | A61B 5/024 |
| 2021/0027676 | A1* | 1/2021 | Dayaram | G06F 3/147 |
| 2021/0065240 | A1* | 3/2021 | Mandic | G06Q 30/0261 |
| 2021/0341300 | A1* | 11/2021 | Beaurepaire | G01C 21/3492 |
| 2022/0223024 | A1* | 7/2022 | Hansen | G08B 21/18 |
| 2022/0234627 | A1* | 7/2022 | Juel | G06Q 30/0205 |
| 2022/0247178 | A1* | 8/2022 | Brombach | H02J 3/38 |
| 2023/0013561 | A1* | 1/2023 | Sanchez | G06V 20/188 |
| 2023/0107449 | A1* | 4/2023 | Ong | G08G 1/166 |
| | | | | 455/456.1 |
| 2024/0166292 | A1* | 5/2024 | Cervino | G09F 27/00 |

* cited by examiner

SCOOTER ADVERTISING SYSTEM AND ASSOCIATED METHODS

RELATED APPLICATIONS

The present invention is related to U.S. Provisional Patent Application Ser. No. 63/326,444 filed Apr. 1, 2022, the entire contents of which are incorporated herein by reference.

TECHNICAL FIELD

The present invention relates to the field of advertising, and, more particularly, to a scooter advertising system and associated methods.

BACKGROUND

Advertisements have been placed on vehicles to increase visibility compared to stationary advertisements. For example, advertisements may be on taxi cabs, busses and other public transportation vehicles that are constantly in motion. More recently, personal transportation vehicles such as scooters have been provided by municipalities so that individuals can reach areas that may not be serviced by the public transportation routes.

However, these existing advertising system are limited in their reach. Accordingly, there is a need for an improved system of advertising that can reach a larger audience.

SUMMARY

In view of the foregoing background, it is therefore an object of the present invention to provide a scooter advertising system. The system includes a scooter configured to transport a driver, an advertising module secured to the scooter and configured to receive advertising data, and an electronic display screen coupled to the advertising module and configured to generate an advertising image thereon using the advertising data. The advertising module includes a transceiver configured to wirelessly communicate with a remote server and receive the advertising data and to transmit data, a graphic display controller configured to generate an advertising image from the advertising data and to transmit a signal to the electronic display screen to display the advertising image, and a GPS tracking module configured to determine a location of the scooter when displaying the advertising image.

In addition, the advertising module may include an impression sensor configured to estimate a number of persons that viewed the advertising image.

The scooter includes a chassis, a vertical stem extending upwards from the chassis, handlebars secured proximate a top end of the vertical stem, and a standing platform secured horizontally to the chassis and positioned for the driver to stand thereon and grab the handlebars. The scooter also includes a rolling mechanism secured to the chassis, a motor configured to drive the rolling mechanism and controlled by the driver, and a power supply coupled to the motor and the advertising module and the electronic display screen. The electronic display screen includes a left side screen and a right side screen secured about the vertical stem of the scooter.

In another aspect, a method of advertising using a scooter is disclosed. The method includes collecting data about a driver, providing an application to the driver to install on a mobile communication device, and providing the scooter to the driver. The method also includes transmitting advertising data to the advertising module to display at least one advertising image on the electronic display screen, receiving a location of the driver using the application on the mobile communication device, and receiving data from the advertising module that includes a duration of time that the scooter was operational and moving and displaying at least one advertising image.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

A scooter advertising system is disclosed. The scooter includes an electronic display screen that is secured to the scooter or other personal transportation vehicle. The electronic display screen is configured to display a graphic image that include text or pictures for advertising a product or service as a driver rides the scooter all over town. The advertising that is displayed may be controlled using a wireless network and changed remotely so that the advertising space can be used on the fly by multiple advertisers.

In addition, the scooter advertising system may also be monetized by the collection of personal data. For example, the person is required to provide extensive information when a person is provided the scooter. That information and background data can be sold.

The scooter with the electronic display screen may be provided to a user free of charge in exchange for using it a certain amount of time each day in specific areas in order to sell the advertising space.

The driver may also be required to use an application on the mobile device that will track them. Accordingly, the tracking data can be stored and provided to an advertiser to show the amount of exposure of the advertising to the public. In a particular aspect, an impression sensor such as LIDAR may be used on the scooter to estimate the number of persons that viewed the advertising.

In a particular aspect, the scooter advertising system described herein is different from the current publicly accessible rental systems for personal transportation. In contrast, the scooters of the present invention are private property and are used only by authorized users. However, in another particular aspect, the advertising module and electronic display screens may be incorporated into public rental networks currently provided by municipalities and government agencies. In addition, the scooters may be privately owned, or owned and operated by specific private entities such as a corporate campus or a university, for example.

Figure 1:
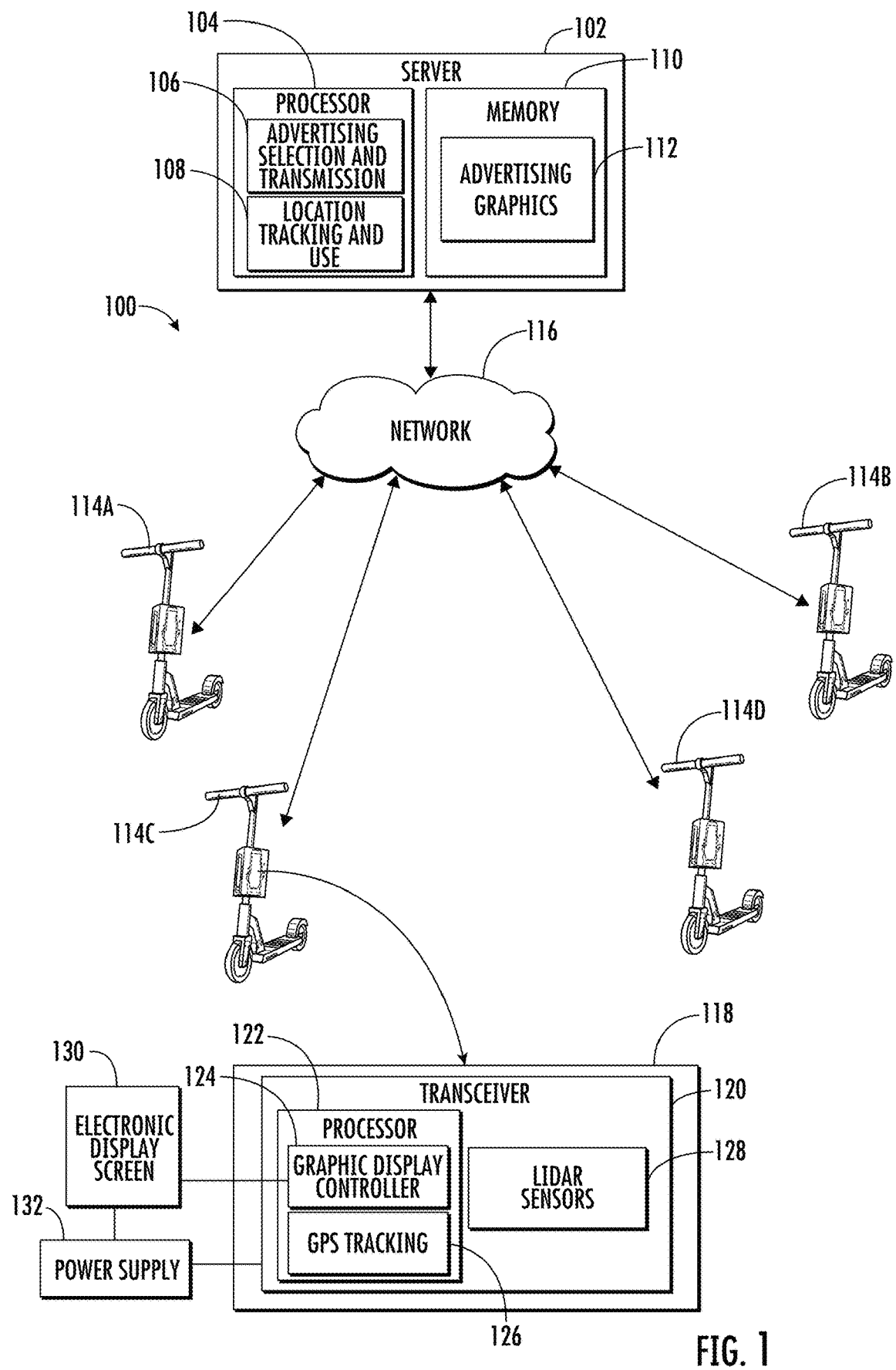
FIG. 1 is a block diagram of a scooter advertising system in which various aspects of the disclosure may be implemented.
Figure 2:
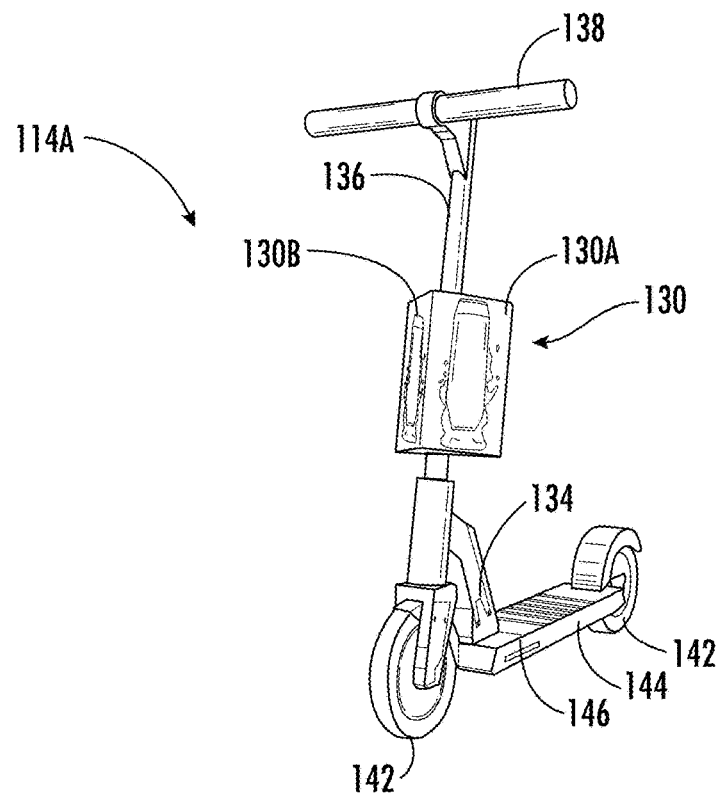
FIG. 2 is a front perspective view of a scooter of the system of FIG. 1.
Figure 3:
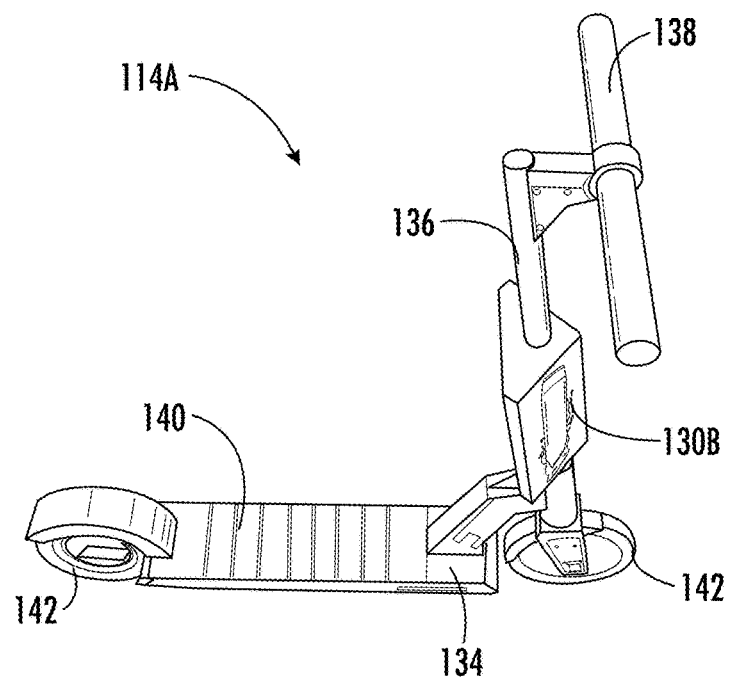
FIG. 3 is a top view of the scooter.
Figure 4:
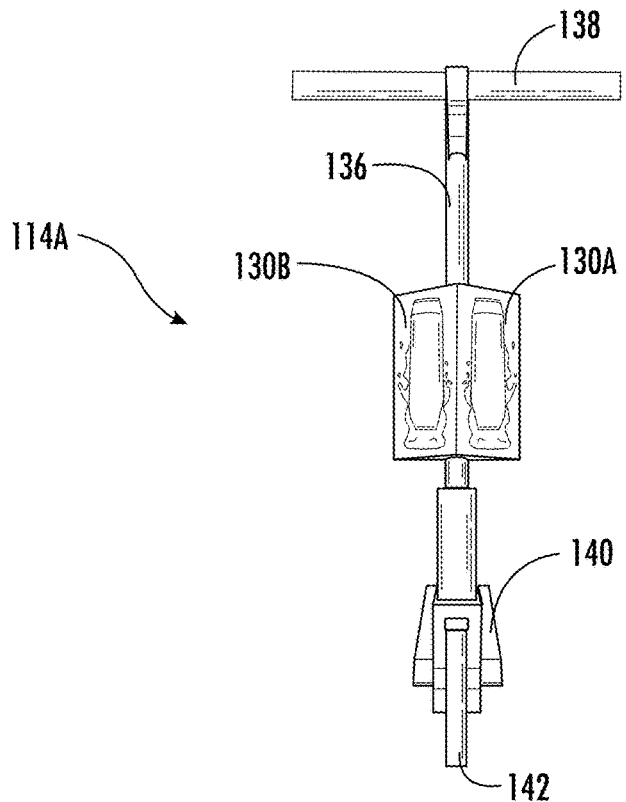
FIG. 4 is a front view of the scooter.
Figure 5:
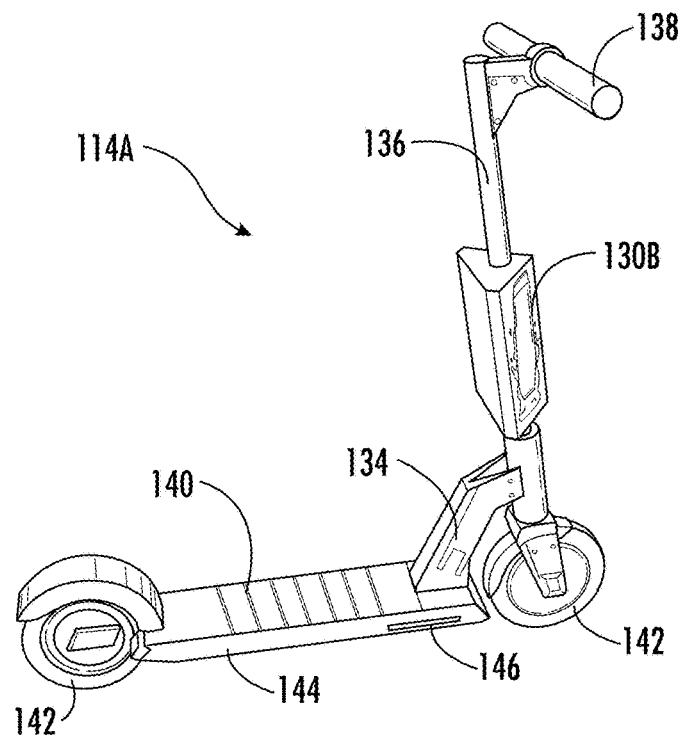
FIG. 5 is an elevational view of the scooter.

Referring now to FIG. 1, a scooter advertising system is disclosed and generally designated 100. The system 100 includes a remote server 102 that includes a processor 104 coupled to a memory 110. The memory 110 is configured to store advertising graphics 112. An advertising selection and transmission module 106 is configured to communicate with the scooter in order to display the desired advertisement. A location tracking and use module 108 is configured to track the scooter and determine the duration that each advertisement was displayed and where.

The server 102 is configured to communicate with the scooters 114a, 114b, 114c, 114d through a wireless network 116. As those of ordinary skill in the art can appreciate, any personal transportation vehicle may be used with the system 100, such as a manual powered bicycle, electric powered bicycle, three wheeled scooter, sit down scooter, stand-up scooter, etc.

Each scooter 114a, 114b, 114c, 114d is configured to transport a driver and has an advertising module 118 secured to the scooter configured to receive advertising data. An electronic display screen 130 is coupled to the advertising module 118 and is configured to generate an advertising image thereon using the advertising data. The electronic display screen 130 may be light emitting diodes (LEDs), for example. The electronic display 130 may be two sided, three sided, four-sided, round, or one piece curved, for example. In addition, the electronic display screen 130 may be secured to the front, side and/or rear of the scooter.

The advertising module 118 includes a transceiver 120 configured to wirelessly communicate with the remote server 102, receive the advertising data, and to transmit data. The transceiver 120 may be configured to wirelessly communicate over a cellular network. The module 118 also includes a processor 122 and a graphic display controller configured to generate an advertising image from the advertising data and to transmit a signal to the electronic display screen 130 to display the advertising image. In addition, a GPS tracking module 126 of the advertising module 118 is configured to determine a location of the scooter when displaying the advertising image, and an impression sensor 128 (e.g., LIDAR) is configured to estimate a number of persons that viewed the advertising image.

Referring now to FIGS. 2-5, the scooter 114a includes a chassis 134, a vertical stem 136 extending upwards from the chassis 134, handlebars 138 secured proximate a top end of the vertical stem 136, and a standing platform 140 secured horizontally to the chassis 134 and positioned for the driver to stand thereon and grab the handlebars 138.

The scooter 114a also includes a rolling mechanism 142 (e.g., axle and wheels) secured to the chassis 134. A motor 144 is configured to drive the rolling mechanism 142 and controlled by the driver, and a power supply 146 is coupled to the motor 144 and the advertising module 118 and the electronic display screen 130. The power supply 146 may be a solar panel, a rechargeable battery or internal combustion engine, for example. The electronic display screen 130 comprises a left side screen 130a and a right side screen 130b secured about the vertical stem 136 of the scooter to provide more visibility of the advertisements.

The electronic display screen 130 may be operational not only when the scooter is being ridden, but also when it is not being actively used by a driver. For example, the scooter can be parked in a public area where the people near the scooter will pass by the electronic display screen 130 and view the advertising image.

Figure 6:
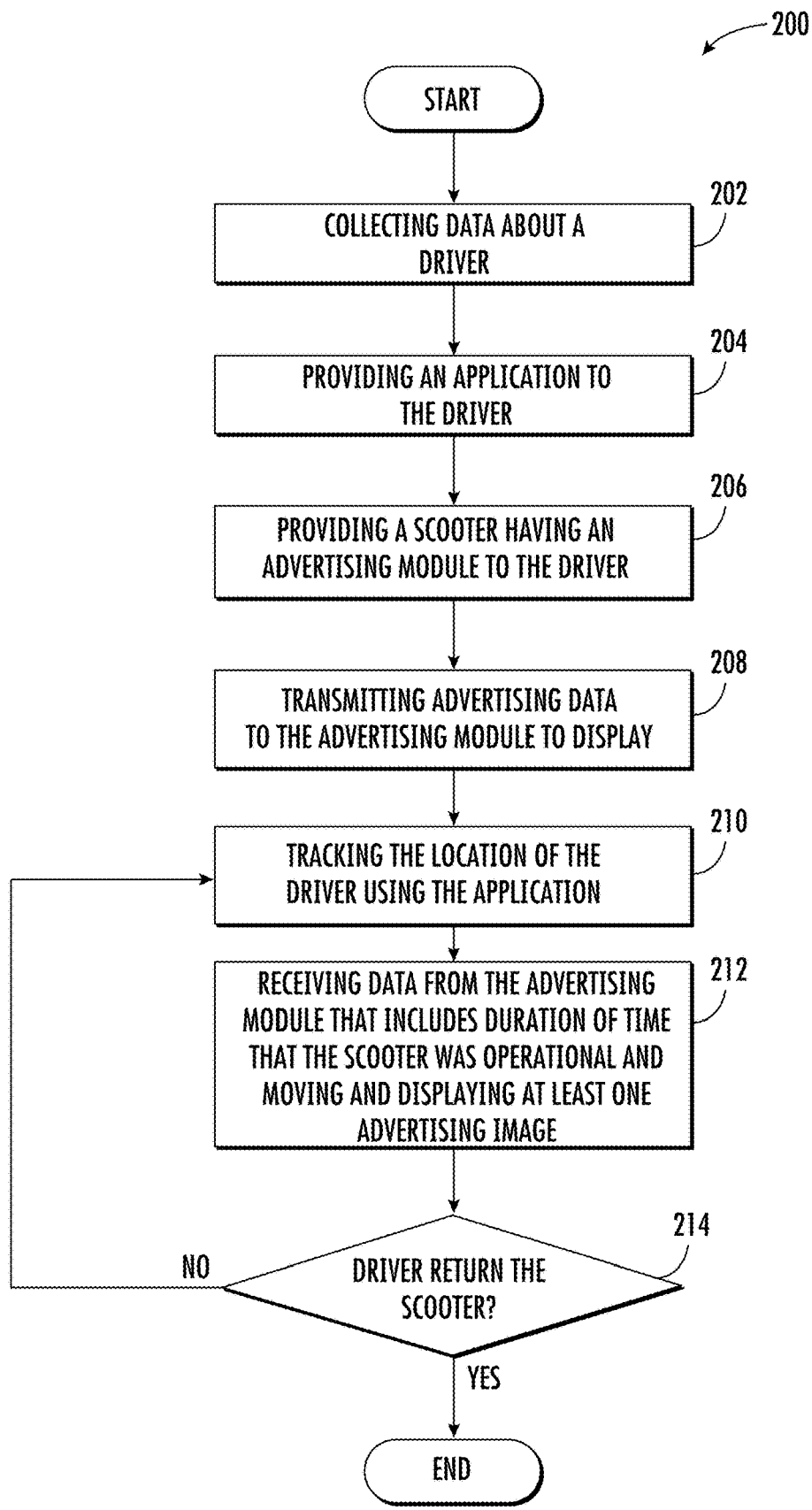
FIG. 6 is a flowchart of a method of advertising using the system of FIG. 1.

In another particular aspect, a method 200 of advertising using the scooter described above is disclosed as illustrated in the flowchart of FIG. 6. The method includes collecting data about a driver, at 202, and providing an application to the driver to install on a mobile communication device, at 204. The method includes, at 206, providing the scooter to the driver, and, transmitting advertising data to the advertising module to display at least one advertising image on the electronic display screen, at 208.

Moving to 210, the method also includes receiving a location of the driver using the application on the mobile communication device, and, at 212, receiving data from the advertising module that includes a duration of time that the scooter was operational and moving and displaying at least one advertising image. If the driver returns the scooter, at 214, the method ends. Otherwise, the method continues and returns to receiving the location of the driver, at 210, until such time as the driver does return the scooter.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A scooter advertising system comprising:
  a scooter configured to transport a driver, the scooter comprising a chassis, a vertical stem extending upwards from the chassis, handlebars secured proximate a top end of the vertical stem, and a standing platform secured horizontally to the chassis and positioned for the driver to stand thereon and grab the handlebars;
  an advertising module secured to the scooter and configured to receive advertising data; and
  an electronic display screen coupled to the advertising module and configured to generate an advertising image thereon using the advertising data, wherein the electronic display screen comprises a left side screen and a right side screen secured about the vertical stem of the scooter;
  wherein the advertising module comprises
    a transceiver configured to wirelessly communicate with a remote server, receive the advertising data, and to transmit data;
    a graphic display controller configured to generate an advertising image from the advertising data and to transmit a signal to the electronic display screen to display the advertising image;
    GPS tracking module configured to determine a location of the scooter when displaying the advertising image; and
    an impression sensor configured to estimate a number of persons that viewed the advertising image while the scooter was operational and moving.

2. The scooter advertising system of claim 1, wherein the scooter further comprises:
  a rolling mechanism secured to the chassis;
  a motor configured to drive the rolling mechanism and controlled by the driver; and
  a power supply coupled to the motor, the advertising module, and the electronic display screen.

3. The scooter advertising system of claim 1, wherein the impression sensor comprises light detection and ranging (LIDAR).

4. The scooter advertising system of claim 1, wherein the electronic display screen comprises a light emitting diodes (LEDS).

5. The scooter advertising system of claim 1, wherein the transceiver is configured to wirelessly communicate over a cellular network.

6. The scooter advertising system of claim 2, wherein the power supply is a rechargeable battery.

7. The scooter advertising system of claim 2, wherein the power supply is an internal combustion engine.

8. A scooter comprising:
a chassis;
a vertical stem extending upwards from the chassis;
handlebars secured proximate a top end of the vertical stem;
a standing platform secured horizontally to the chassis and positioned for the driver to stand thereon and grab the handlebars;
a rolling mechanism secured to the chassis;
a motor configured to drive the rolling mechanism and controlled by the driver; and
a power supply coupled to the motor, the advertising module, and the electronic display screen,
an advertising module secured to the scooter and configured to receive advertising data;
an electronic display screen coupled to the advertising module and configured to generate an advertising image thereon using the advertising data, wherein the electronic display screen comprises a left side screen and a right side screen secured about the vertical stem of the scooter; and
an impression sensor configured to estimate a number of persons that viewed the advertising image while the scooter was operational and moving.

9. The scooter of claim 8, wherein the advertising module comprises:
a transceiver configured to wirelessly communicate with a remote server, receive the advertising data, and to transmit data;
a graphic display controller configured to generate an advertising image from the advertising data and to transmit a signal to the electronic display screen to display the advertising image; and
a GPS tracking module configured to determine a location of the scooter when displaying the advertising image.

10. The scooter of claim 9, wherein the electronic display screen comprises a light emitting diodes (LEDs).

11. The scooter of claim 10, wherein the power supply is a rechargeable battery, an internal combustion engine, or both.

12. A method of advertising using a scooter comprising a chassis, a vertical stem extending upwards from the chassis, handlebars secured proximate a top end of the vertical stem, and a standing platform secured horizontally to the chassis and positioned for the driver to stand thereon and grab the handlebars, and having an electronic display screen coupled to an advertising module, wherein the electronic display screen comprises a left side screen and a right side screen secured about the vertical stem of the scooter, the method comprising:
transmitting advertising data to the advertising module to display at least one advertising image on the electronic display screen; and
estimating a number of persons that viewed the advertising image using an impression sensor while the scooter was operational and moving.

13. The method of claim 12, further comprising receiving data from the advertising module that includes a duration of time that the scooter was operational and moving and displaying at least one advertising image.

14. The method of claim 13, further comprising providing an application to a driver of the scooter to install on a mobile communication device.

15. The method of claim 14, further comprising collecting data about the driver of the scooter.

16. The method of claim 15, further comprising receiving a location of the driver using the application on the mobile communication device.

* * * * *